Patented Sept. 1, 1936

2,053,149

UNITED STATES PATENT OFFICE 2,053,149

PROCESS OF PRODUCING IRON ALLOYS

Friedrich Johannsen, Magdeburg, Germany

No Drawing. Application November 1, 1934, Serial No. 751,094. In Germany December 14, 1933

3 Claims. (Cl. 75—131)

My invention relates to the problem of directly producing iron alloys containing non-ferrous metals such as nickel, cobalt, etc., which form alloys with iron below the melting point of the respective alloys, and which can be reduced in practice under about the same conditions, particularly like temperatures, at which the iron is reduced; the primary object being to obtain under conditions of economy iron alloys, which can be used to advantage for the production of special steels i. e. stainless, heat resisting and other steels.

Another object of the invention is to produce in an economical manner iron alloys containing the aforesaid non-ferrous metals, which can be afterwards recovered therefrom by subsequent processes or from which alloys of another composition can be produced for instance iron alloys containing a higher percentage of the non-ferrous metal concerned.

Still other objects of the invention will become incidentally apparent hereinafter to those skilled in this art.

The nature and scope of this invention are briefly outlined in the appended claims and will be more fully understood from the following specification taken together with the introductory synopsis of the prior art.

It has been proposed to directly produce iron alloys of the composition and for the purposes set forth, including ferro-nickel, in electrically heated furnaces, in which the metal oxides of the ores or other raw materials are reduced, the alloys being obtained in a liquid form, which are finally separated from the molten slags.

As a matter of fact known to practitioners this process can be carried out in practice under conditions of economy only where electric-current can be supplied at extraordinarily cheap rates, and where the ores or other metallurgical products under treatment are relatively rich in their content of the non-ferrous metals concerned, viz, when comparing the market price of the specific non-ferrous metal and its production costs.

For instance chromium-iron and nickel-iron are mainly produced in countries like United States of America, Norway, and Canada, where electricity can be cheaply produced by water power.

I have attempted in the course of my experimental and research work to produce in analogy to well known reducing processes a concentrate of metallic iron and of the non-ferrous metals concerned by subjecting the raw materials to a reducing treatment at relatively low temperatures, at which the reduced metals are not molten but obtained in the form of sponge; the object of my experiments was to obtain by a subsequent separating process, i. e., by electromagnetic separation a pure spongy concentrate of iron and the non-ferrous metals, from which a molten alloy could be easily obtained.

However, my experiments showed that the recovery of the non-ferrous metals from the raw products could not be carried out to satisfaction, viz, under conditions of economy and that also the spongy product was not so rich in iron and non-ferrous metals, that it could be subjected to advantage to a melting process.

In the course of my continued experimental work I have found, that iron alloys containing the non-ferrous metals concerned—including nickel and cobalt—can be directly produced under conditions of economy by mixing the raw material with reducing agents preferably carbonaceous matter such as coal or coke, heating the mixture in a metallurgical furnace up to temperatures, at which the iron oxides and the oxides of the non-ferrous metals are reduced to sponge, further heating up the charge to temperatures, at which the sponges of the iron and of the non-ferrous metals will combine and weld together so as to form compact, solid lumps, which are embedded in the slags concurrently produced; causing said lumps and slags to be discharged from the furnace for further treatment, including crushing, grinding, sieving, and electromagnetically separating the metallic constituents from the slags.

I prefer to carry out the aforesaid process in practice by using a reverberatory furnace particularly one of the rotary tubular types, in which the raw materials are treated continuously or in a discontinuous manner.

Good results have been obtained in the course of my experiments by mixing 12 tons of nickel ores containing about 1% nickel in the form of a silicate, 0.3% chromium and about 10% iron in the form of an oxide, with about 20% coal, causing the mixture to pass in a continuous manner through a tubular rotary furnace of 16 meters length, and 1.20 m. diameter, the total treatment within the furnace taking about 6–8 hours.

The maximum temperature within the furnace at a point close to its discharge end was about 1200°–1300° centigrade; the lumps of the iron alloys were produced near the discharge end of the furnace by blowing onto the surface of the charge a flame containing an excess of air: I attribute the results obtained by the aforesaid process to the following reactions:

On passing through the furnace and being heated up the metal oxides of the raw materials are first converted into sponge; the spongy material on entering the zone in which the oxidizing flame or—temporarily—a jet of air impinges upon the surface of the charge is oxidized at the surface, whereby the temperature is incidentally increased, while the metal oxides and the gangues form semiliquid slags which flow out of the spongy material, while the latter is about to lump; in the course of the further trundling around motion within the furnace the material, which was oxidized at the surface of the charge will in turn proceed into and be re-embedded within the layer of the charge with the result, that the metal oxides are re-reduced by the carbonaceous matter still present in the charge.

The semi-liquid slags, in which the lumps of metal alloys are embedded, were finally discharged from the furnace in the usual manner and were ground up in a ball mill; the lumps of iron alloys remaining therein in a practically non-comminuted condition were periodically removed from the ball mill. The slags, ground to less than 1 mm. in size contained still a small percentage of very small lumps of iron alloys and were subjected to a further electromagnetic separation treatment, in the course of which slags containing only 0.1% Ni and 6% Fe were finally obtained. The magnetic products recovered by the electromagnetic separation and containing about 4% Ni and 35% Fe were returned into the furnace for re-treatment. The lumps separated within and discharged from the ball mill contained about 8.5% Ni, 3% Cr, and 85% Fe.

In the course of another modified experiment, in which the same rotary furnace was used, 12 tons of nickel ore containing 4.8% Ni, 30.5% Fe were treated according to this invention in a continuous manner with the object of producing lumps of iron alloys containing the highest possible content of nickel. For this purpose the process was carried out in such manner, that by more violent oxidation of the charge by blowing thereonto a larger volume of oxidizing gases a relatively high percentage of iron was transferred into the slag.

As anticipated, the nickel content of the slag remained relatively low, a phenomenon which I attribute to the fact that oxygen has less affinity to nickel than to iron. The lumps obtained by the modified process contained 17.8% Ni and 78.5% Fe, the dumped slags containing 0.1% Ni and 12.1% Fe.

Various other modifications and changes may be conveniently made in carrying out in practice the above described process for the production of lumps of iron alloys of the composition and for the purposes set forth, without departing from the spirit and the salient ideas of this invention:

For instance the reduction of the metal oxides of the raw materials into sponge and the conversion of the sponges obtained into lumps of iron alloys may be conveniently made in separate metallurgical furnaces.

Instead of mixing initially the raw materials with reducing agents such as solid or liquid fuel, the reduction may be conveniently carried on by means of a gaseous reducing agent such as generator gas.

Instead of introducing into the furnace a flame containing an excess of air only a current of air—no heating gases—may be introduced continually or temporarily consistent with temperature conditions within the furnace and the composition of the charge.

In places where electric power is cheap the furnace used for this process may be electrically heated instead of by fuel. Furthermore it may be advantageous to accomplish the lumping of the metal sponges by feeding into the lumping zone of the furnace solid oxidizing material such as iron oxides, limestone, or a liquid oxidizing agent, preferably water, instead of using oxidizing gases for the re-oxidation.

My practical experiments and research work have further revealed the fact that the recovery of the non-ferrous metals is enhanced by adding to the charge substances, containing sulphur, which is absorbed by the alloys produced, and by which the reception of the non-ferrous metals into the alloys is enhanced.

In practice a relatively small percentage of the said substances will suffice for substantially aiding in the recovery of the non-ferrous metals. For instance by adding a sulphur-iron compound such as pyrite in such quantity that the alloys produced will contain about 2–10% of sulphur the recovery of such metals having a particular affinity to sulphur for instance nickel, copper, and the precious metals, i. e. gold, silver and platinum, is substantially enhanced.

Moreover by the addition of the aforesaid substances aiding in the recovery of non-ferrous metals the lumping process proper and the subsequent separation treatment need not be modified or changed even in cases where the alloys are about to melt in the lumping zone or are partly molten therein—a condition which is due to the fact, that the alloys retain their magnetic properties, and the separation of the alloys from the slag can be effected as mentioned above.

The process according to this invention lends itself to the recovery of all metals which can be reduced nearly as easily as or more easily than iron, viz., V, Mn, Cr, Wo, Mo, Co, Ni, Cu, Ag, Au, Pt, as the said metals combine and alloy themselves with iron at temperatures at which the iron is not yet molten, that is to say the non-ferrous metals while being in a spongy condition are converted by a welding process together with the iron sponge into solid lumps which are embedded in the slags concurrently produced.

With the object of not limiting the scope of my invention but to still more exhaustively foreshadow the many possibilities afforded thereby in the recovery of non-ferrous metals under strictly economical condition, I may further mention that—although the lumping of the alloys is generally to be accomplished at temperatures ranging from about 1200–1450° centigrade depending on the specific composition of the gangues, viz, below the fusing point of the alloys concerned, in special cases it may occur that the lumped alloys are by chance heated up to their fusing point and melt together into larger lumps.

While as a matter of fact the ores and metallurgical products containing non-ferrous metals, which are to be recovered according to this process mostly contain a sufficiently large percentage of iron oxides for carrying out the process, in exceptional cases it may become necessary to add to the charge a certain amount of iron oxides for instance iron ore, purple ore, slag containing iron, etc.

The above described process can be used to advantage for the recovery of the aforesaid non-ferrous metals from ores and metallurgical products of all kinds and furthermore for the production of iron alloys of specific composition. For instance in cases where an iron alloy is required containing 1% Ni, 2% Cr, 0.3% Mo, the process can be easily carried on in practice by using as raw material iron ores, which are practically free from non-ferrous metals and to which nickel ores, chromium ores and molybdenum ores are added in such quantities, determined by experience, analysis and calculation, that an iron alloy of the specified composition is obtained.

What I claim is:—

1. Process of producing concentrates containing non-ferrous metals, including nickel and cobalt, which can be reduced under about the same conditions, under which iron oxide is reduced, which comprises causing ferriferous raw material containing in addition to the non-ferrous metals concerned sulphur to be charged into and pass through a metallurgical furnace, agitating the charge therein and preheating it in the presence of reducing agents to temperatures, at which the compounds of the iron and of the non-ferrous metals are reduced and converted into sponges, causing the charge to be further heated up to temperatures, at which the sponges of the iron and of the non-ferrous metals, together with the sulphur, will combine and weld together so as to form lumps, which are embedded in slags concurrently produced, causing said slags and lumps of metal alloys and sulphur compounds to flow from the furnace and recovering therefrom the lumps of metal alloys.

2. Process of producing concentrates containing non-ferrous metals, including nickel and cobalt, which can be reduced under about the same conditions, under which iron oxide is reduced, which comprises mixing ferriferous raw material containing the non-ferrous metals concerned with a substance containing sulphur in such proportions, that in the mixture the quantity of sulphur compared to that of the non-ferrous metals concerned is about 2–10%, causing the mixture to be charged into and pass through a metallurgical furnace, agitating the charge therein and preheating it in the presence of reducing agents to temperatures, at which the compounds of the iron and of the non-ferrous metals are reduced and converted into sponges, causing the charge to be further heated up to temperatures, at which the sponges of the iron and of the non-ferrous metals, together with the sulphur, will combine and weld together so as to form lumps, which are embedded in slags concurrently produced, causing said slags and lumps of metal alloys and sulphur compounds to flow from the furnace and recovering therefrom the lumps of metal alloys.

3. Process of producing concentrates containing non-ferrous metals, including nickel and cobalt, which can be reduced under about the same conditions, under which iron oxide is reduced, which comprises mixing ferriferous raw material containing the non-ferrous metals concerned with a sulphur containing iron compound in such proportions, that in the mixture the quantity of sulphur compared to that of the non-ferrous metals concerned is about 2–10%, causing the mixture to be charged into and pass through a metallurgical furnace, agitating the charge therein and preheating it in the presence of reducing agents to temperatures, at which the compounds of the iron and of the non-ferrous metals are reduced and converted into sponges, causing the charge to be further heated up to temperatures, at which the sponges of the iron and the non-ferrous metals, together with the sulphur, will combine and weld together so as to form lumps, which are embedded in slags concurrently produced, causing said slags and lumps of metal alloys and sulphur compounds to flow from the furnace and recovering therefrom the lumps of metal alloys.

FRIEDRICH JOHANNSEN.